US007439295B2

(12) United States Patent
Gibbison et al.

(10) Patent No.: US 7,439,295 B2
(45) Date of Patent: Oct. 21, 2008

(54) SYNERGISTIC COATING COMPOSITION FOR INKJET PRINTING

(75) Inventors: Robert Gibbison, Kent (GB); Andrew Mint, Hampshire (GB); Sarah Orton, Surrey (GB); Edward Johnson, Pompton Lakes, NJ (US)

(73) Assignee: ISP Investments Inc., Wilmington, DE (US)

( * ) Notice: Subject to any disclaimer, the term of this patent is extended or adjusted under 35 U.S.C. 154(b) by 604 days.

(21) Appl. No.: 11/057,649

(22) Filed: Feb. 14, 2005

(65) Prior Publication Data

US 2005/0146589 A1 Jul. 7, 2005

Related U.S. Application Data

(63) Continuation-in-part of application No. 10/267,440, filed on Oct. 9, 2002, now abandoned.

(51) Int. Cl.
*C08K 3/34* (2006.01)

(52) U.S. Cl. ....................................... 524/492; 524/493

(58) Field of Classification Search ................. 524/492, 524/493

See application file for complete search history.

(56) References Cited

U.S. PATENT DOCUMENTS

| | | | | | |
|---|---|---|---|---|---|
| 5,985,425 | A | * | 11/1999 | Tomizawa et al. | 428/212 |
| 6,677,007 | B1 | * | 1/2004 | Warner et al. | 428/32.34 |
| 2002/0045034 | A1 | * | 4/2002 | Nakatani et al. | 428/195 |
| 2002/0182376 | A1 | * | 12/2002 | Mukherjee et al. | 428/195 |

FOREIGN PATENT DOCUMENTS

EP 0487350 * 5/1992

* cited by examiner

*Primary Examiner*—Edward J Cain
(74) *Attorney, Agent, or Firm*—William J. Davis

(57) ABSTRACT

An inkjet-receptive coating composition for efficacious inkjet printing which is a synergistic composition of swellable, water-insoluble polyvinylpolypyrrolidone particles and (fumed) silica or silica gel particles.

10 Claims, 1 Drawing Sheet

FIGURE
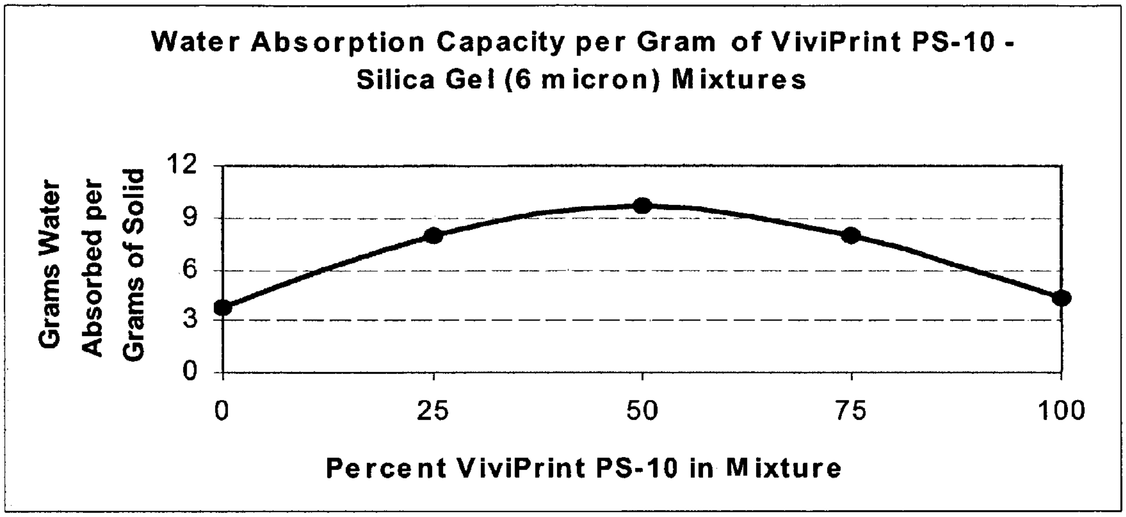

SYNERGISTIC COATING COMPOSITION FOR INKJET PRINTING

CROSS-REFERENCE TO RELATED U.S. PATENT APPLICATION

This application is a continuation-in-part of U.S. patent application Ser. No. 10/267,440, filed Oct. 9, 2002, now abandoned.

BACKGROUND OF THE INVENTION

1. Field of the Invention

This invention relates to an inkjet-receptive coating composition for efficacious inkjet printing, and, more particularly, to a synergistic composition of swellable, water-insoluble polyvinylpolypyrrolidone particles and (fumed) silica or silica gel particles.

2. Description of the Prior Art

The image quality of inkjet printing has begun to approach that of silver halide photography and these advances have carried inkjet printing to the point where a further advance now depends on the quality of inkjet papers. An inkjet printed image on plain paper is generally inferior to a silver halide image on photographic paper, but it becomes difficult to distinguish between the two when the inkjet printing is performed on high-grade photo paper.

Currently, three types of glossy inkjet paper are used: cast-coated, swelling and microporous. Cast-coated paper is of limited image quality as its base paper absorbs ink. Swelling and microporous papers avoid this because they use a polyethylene (PE) coated base paper that makes the base impermeable to ink. The PE coated bases, however, do not absorb ink; hence the image quality of swelling and microporous papers depends chiefly on the mechanisms of the image receiving layers. Swelling papers consist mainly of water-soluble polymers, offering high optical density, but slow drying, disadvantageous curl and low water resistance. Printing on plastic or fabric presents even more challenges particularly with respect to achieving fast ink drying times.

Accordingly, it is an object of this invention to provide synergistic inkjet-receptive coating compositions for inkjet-substrates such as paper, plastic or fabric for efficacious inkjet printing.

A particular object of this invention is to provide synergistic coating compositions for such substrates so that the ink will dry quickly thereon.

SUMMARY OF THE INVENTION

What is described herein is an inkjet-receptive coating composition for inkjet printing on a substrate with advantageous ink dry times comprising 10-90 wt. %, preferably 25-75 wt. %, and most preferably 50 wt. % polyvinylpolypyrrolidone (PVPP), having an average particle size of 5-30 μm, and, 10-90 wt. %, preferably 75-25%, most preferably 50% of silica gel having an average particle size of 3-16 μm, or fumed silica having an average particle size of 0.05-0.12 μm.

IN THE DRAWING

The FIGURE shows the water (ink) absorption capacity of the coating compositions of the invention.

DETAILED DESCRIPTION OF THE INVENTION

The crosslinked polyvinylpolypyrrolidone (PVPP) component of the inkjet-receptive coating composition of the invention is a free-flowing powder having an average particle size of about 5-30 μm, generally about 15 μm, and a BET surface area of about 1.9 $m^2/g$. PVPP is water-insoluble but is swellable up to 1.8×its volume, and it displays a mildly cationic characteristic. The uncrosslinked, or water soluble polyvinylpyrrolidone, PVP, is not suitable for use in this composition.

The silica component of this combination is either a silica gel or fumed silica. Gel silicas are hard aggregates having a high internal porosity for enmeshing the polyvinylpolypyrrolidone particles, and a particle size of 3-16 μm. A typical silica gel is sold as Silcron® (Millenium Chemical Co.) having an average particle size of 5 μm. Fumed silicas, while having little or no internal porosity, have a plurality of chain-like particles with jagged edges which stick together to form agglomerate particle chains which readily permit attachment to the crosslinked polyvinylpolypyrrolidone particles. The BET surface area of fumed silica reflects overwhelmingly external surface area and little internal porosity. A typical fumed silica has a BET surface area of 380 $m^2/g$, a high bulk density and a particle size in the range of 0.05-0.12 μm.

Colloidal silicas, e.g. Nyacol® and Bindzil® (Akzo Nobel), have neither internal porosity or jagged edges, and so are not suitable for use in this synergistic composition.

The combination of PVPP and gel or fumed silica is microporous in nature and its structure presents a honeycomb of pores to receive the ink. Such an admixture thus achieves high ink absorbing speed, i.e. fast drying times, and image permanence without swelling the paper.

The synergistic compositions of the invention in water provide an advantageous increase in viscosity. The compositions can be readily converted into a homogeneous dispersion.

The compositions herein optionally may include a binder material, such as polyvinyl alcohol, starch, gelatin, PVP, PVP copolymers, or a latex to assist in holding the composition together. Polyvinyl alcohol or PVP is preferred. The compositions of the invention can be used with any binder material conventionally used in the art.

The PVPP-silica gel or fumed silica composition of the invention more readily absorbs color inks on substrates such as paper, plastics and fabrics than its individual components, or of compositions in which PVP or colloidal silica replaces its corresponding effective component of the composition. Furthermore improved color density and water-resistant prints are obtained herein when the substrate is coated with the composition of the invention. Also, desirable print qualities such as tack-free, color uniformity and scratch resistance also are maintained intact using the coating compositions of the invention on a substrate.

Most importantly, advantageously fast ink dry times are achieved on the coated substrate. Particularly, a 3 to 5 time improvement in ink dry times is realized with commercial inks, e.g. HP inks, with the coating composition of the invention over its individual components alone, or when less effective PVP or colloidal silica is substituted for PVPP or silica gel/fumed silica, respectively.

The water absorption capacity per gram of a PVPP (ViviPrint™ PS-10)-silica gel or fumed silica composition varies with the weight ratio of each component in the composition. For example, a complex of PVPP and silica gel or fumed silica, in a weight ratio of 10-90:90:10, preferably 25-75:75:25, and, most preferably, 50:50, absorbs significantly more fluid, i.e. water or ink, than PVPP or silica alone. The Figure herein shows this effect. At an optimum 1:1 weight ratio, the composition absorbs 3 times as much water as its individual components. As a result, the ink dry times are reduced accordingly, and with less impact on gloss.

The invention will now be described in more detail with reference to the following experimental results.

Coating Formulations—PVPP and Fumed Silica

A. Formulations of PVPP and fumed silica in ratios of 30:70 and 50:50 by weight were prepared with a polyvinyl alcohol (PVOH) as a binder. The weight ratio of PVOH to silica/PVPP was 1:2. With added water, the formulations had a solids content of 18 wt. %.

TABLE 1

| Ingredient | Formulation A 0% PVPP (Mass/g) | B 30% PVPP (Mass/g) | C 50% PVPP (Mass/g) |
|---|---|---|---|
| PVPP (15% solids solution)** | | 141 | 235 |
| Fumed Silica (15% solids solution)* | 470 | 329 | 235 |
| PVOH (35% solids solution) | 100 | 100 | 100 |
| Water | 20 | 20 | 20 |

*Sigma-Aldrich Chemicals (99.8% fumed silica, surface area 380 $m^2/g$)
**ISP Corp.

Coating Technique:

Each formulation was applied to 80 gsm ASA sized paper using the K coater, Meyer bar 0, speed 3. The coatings weighed 20-21 gsm, after drying at 100° C. for 2 minutes.

Evaluation of Coated Paper Printing:

Both thermal and piezoelectric print heads were utilized:

HP DeskJet 930C—mode-plain paper draft print quality 300×600 dpi was used. Typically an Epson Stylus Photo 890 was used alternatively, plain paper, automatic, microweave on, high speed on—360 dpi. Color blocks of black, cyan, magenta and yellow were produced on the printer for each formulation and for the uncoated base paper which was used as a reference for optical density measurements. Lines, DPI varying color blocks and interbleed color blocks were printed for microscopy.

Printing Assessments:

Drying Times

Each print was allowed to dry for 1 minute after printing, and then each color block was transfer tested (blotted) onto ASA 80 gsm. The amount of ink transfer was visually interpreted and scored 0 (total transfer)—10 (no transfer).

Optical Density and Water Fastness—Change in Optical Density After Water Immersion Water immersion 23° C./10 mins.

Instrumentation—GretagMacbeth D196, where the unprinted paper coating was used as the white base standard and the filmic coatings were overlaid onto ASA paper and the unprinted area used as the white base standard. The optical density was read over 4 areas on each color block to assess the variation (mottle).

Preparation of Coated Papers

The Flow Chart below was used to prepare papers coated with the compositions of the invention.

Preparation of Coated Papers

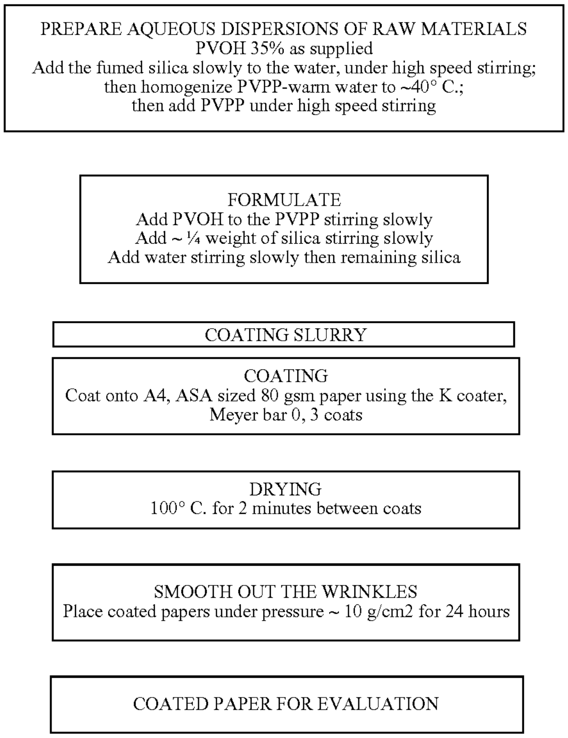

Results

1. Drying Times

The dry time transfer test was a visual interpretation of the amount of ink transferred onto a standard base paper 1 minute after printing. All formulations scored 10 with no ink transfer.

2. Initial Optical Density

A slight decrease in optical density as the PVPP content increased in the composition was noted because the high interstitial porosity of the fumed silica gave excellent print definition and ink resolution which could not be fully matched by PVPP. This trend, however, was very much less marked with the HP inks; typically, black HP pigmented ink showed no change in optical density with compositions containing PVPP.

The degree of variation in optical density (mottle) however, decreased as the silica was replaced by the PVPP, perhaps because PVPP provided a more even coating.

3. Water Resistance Tests

As the silica was replaced by PVPP in the composition, the water resistance of the print increased significantly for both Epson and HP inks. Specifically, the Epson inks gave up to 68% loss of optical density after water immersion with 0% PVPP, only up to 13% loss with 30% PVPP and only a maximum of 7% loss with 50% PVPP in the composition.

These advantageous results were only somewhat less pronounced with HP inks.

Coatings on Polyester Film

The additional tests performed herein were made by color printing onto polyester film from an HP printer. Polyester film, in contrast to paper, ordinarily produces films in which the ink dries very slowly; accordingly, it is a more vigorous test substrate than paper for determining the efficacy of a given coating composition with respect to print dry times. Control tests with PVPP, water soluble PVP and various silicas alone were used to compare the improvement in print times using substrates coated with the composition of the invention over the simple substance.

CONTROL EXAMPLES

A. Uncrosslinked polyvinylpyrrolidone (ViviPrint 530 (PVP K-90) ISP) in water (10% solution) was coated to a depth of about 9 g/m$^2$ onto white Melinex® film (polyester) and printed in a HP printer using photo quality settings. The print dry time was 120 seconds.

B. The control was repeated using crosslinked polyvinylpolypyrrolidone (ViviPrint PS-10, ISP). The dry time was 70 seconds at 5 wt. %.

C. Silica gel (Silcron® Millenium Chemicals) was used. The dry time was 30 seconds at 5 wt. %.

D. Fumed silica (Degussa-WK 341) was coated onto the film on the same weight basis. The ink dry time was 60 seconds at 5 wt. %.

E. Colloidal silica, alone and with crosslinked PVPP, was used as the coating material on the same weight basis as above. The ink dry times were 2 minutes.

INVENTION EXAMPLES

A. PVPP and Silica Gel (50:50 Wt. Ratio)

1.25 g of ViviPrint PS-10 (crosslinked PVPP) (ISP) having an average particle size of about 5 μm and 1.25 g of silica gel (Silcron®—Millenium) having an average particle size of 6 μm were blended using 38.46 g of ViviPrint 530 (PVPP K-90), a 26.5% solution, as a binder in 58.84 g water. The ViviPrint PS-10 was slowly added to the water with stirring over an hour. Then the silica was added with stirring over an hour. Then the silica was added with stirring and the mixture homogenized for 10 minutes. The resulting paste was slowly added to the ViviPrint 530 with stirring using water to adjust its viscosity. Then the mixture was stirred for at least 10 minutes. The composition was coated at a concentration of 9 g solids/m$^2$ onto white Melinex® film. The coated film was dried for 15 minutes at 85° C.

The ink dry time was unexpectedly 10 seconds at 5 wt. % combined PVPP and silica gel solids.

B. PVPP and Fumed Silica (4:10 Wt. Ratio)

4 g of ViviPrint PS-10 (crosslinked PVPP) (ISP) was swelled in 30 g water with stirring and 10 g of commercial fumed silica (Degussa WK 341) was added. Then 100 g of PVP K-90 was added. Coating was made with a 38 rod on Melinex (polyester) at 8 g/m$^2$.

The ink dry time was unexpectedly 15 seconds at 5 wt. % of combined PVPP and fumed silica solids.

While the invention has been described with particular reference to certain embodiments thereof, it will be understood that changes and modifications may be made which are within the skill of the art.

What is claimed is:

1. A synergistic inkjet-receptive coating composition which is a microporous composition for inkjet printing on a substrate with advantageous ink dry times comprising:

(a) swellable, water-insoluble polyvinylpolypyrrolidone (PVPP) particles and (b) fumed or gel silica particles, wherein the weight ratio of (a) to (b) is 10-90:90-10.

2. A synergistic composition according to claim 1 wherein the weight ratio of, (a):(b) is 25-75:75:25.

3. A synergistic composition according to claim 1 wherein said weight ratio of (a):(b) is about 50:50.

4. A synergistic composition according to claim 1 wherein the average particle size of said fumed silica is 0.05-0.12 μm.

5. A synergistic composition according to claim 3 wherein the average particle size of said gel silica is 3-16 μm.

6. A synergistic composition according to claim 1 which includes a binder.

7. A synergistic composition according to claim 6 wherein said binder is selected from polyvinyl alcohol, starch, gelatin, PVP or PVP copolymers, or a latex.

8. A synergistic composition according to claim 1 which includes water.

9. A synergistic composition according to claim 8 which is an aqueous dispersion having a solids content of about 18%.

10. A synergistic composition according to claim 1 wherein said substrate is paper, plastic or fabric.

* * * * *